United States Patent [19]
Kaminskas

[11] Patent Number: 4,811,034
[45] Date of Patent: Mar. 7, 1989

[54] STOWABLE REFLECTOR

[75] Inventor: Rimvydas A. Kaminskas, Palos Verdes Estates, Calif.

[73] Assignee: TRW Inc., Redondo Beach, Calif.

[21] Appl. No.: 80,277

[22] Filed: Jul. 31, 1987

[51] Int. Cl.⁴ .................................... H01Q 15/20
[52] U.S. Cl. .............................. 343/915; 343/DIG. 2
[58] Field of Search ............... 343/915, DIG. 2, 908, 343/916

[56] References Cited

U.S. PATENT DOCUMENTS

| | | | |
|---|---|---|---|
| 2,471,828 | 5/1949 | Mautner | 343/18 |
| 3,354,458 | 11/1967 | Rottmayer | 343/18 |
| 3,690,080 | 9/1972 | Dillard | 52/108 |
| 3,927,574 | 5/1974 | Rice | 74/57 |
| 4,482,900 | 11/1984 | Bilek et al. | 343/915 |

OTHER PUBLICATIONS

Powell, "An Entree for Large Space Antennas", Astronautics & Aeronautics, Dec. 1977.

Primary Examiner—William L. Sikes
Assistant Examiner—Doris J. Johnson
Attorney, Agent, or Firm—Ronald M. Goldman; Sol L. Goldstein

[57] ABSTRACT

A plurality of small segments stowed in a compact stack are assembled, essentially automatically, into a large construction surface, such as a flat or parabolic reflector. A stowable portable construction surface of the kind having a plurality of surface segments of essentially identical configuration stacked along a common axis in overlying spaced relationship for storage in minimum space and assembleable into a side by side to extend over a wide are approximately equal to the sum of the areas of said segments means is improved by including a translational hinge means, either "step-up" or "step-down" in vertical translation, said hinge means connecting said segment means together serially and responsive to pivotal movement of one of said segment means relative to an attached other of said segment means for causing at least one edge of said moving segment means to move in vertical position from a position spaced from and coaxial with said hingedly attached other segment means to side by side relationship with said attached other segment means.

25 Claims, 6 Drawing Sheets

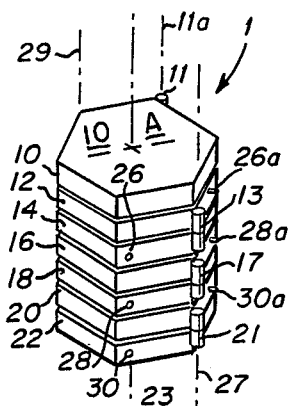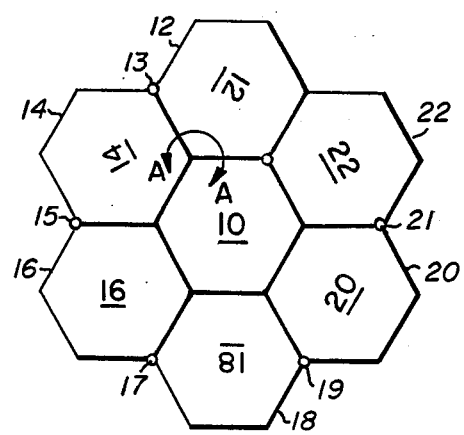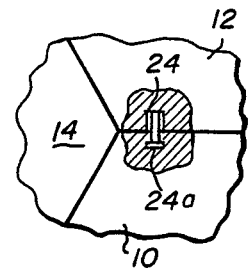
Fig_1    Fig_2    Fig_2a
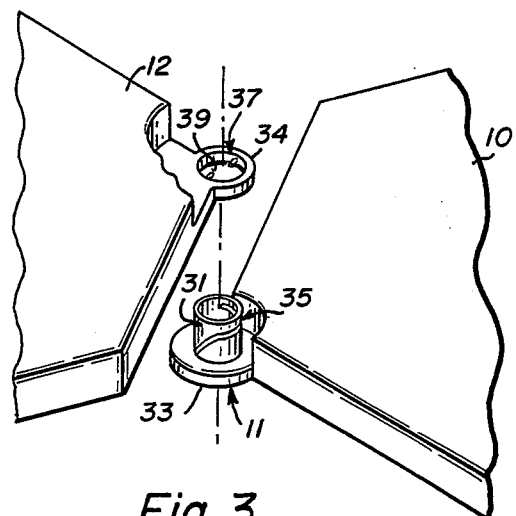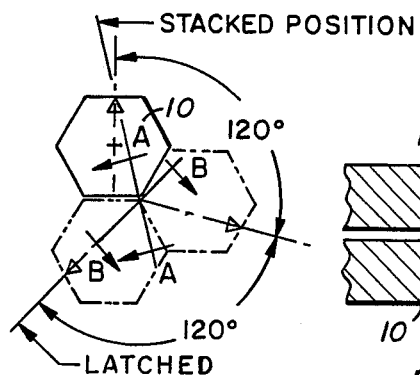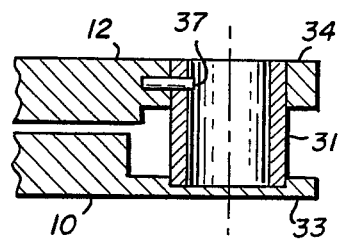
Fig_3    Fig_4a    Fig_4b
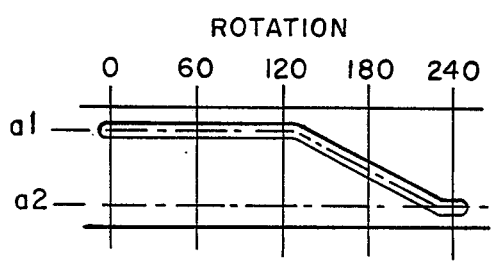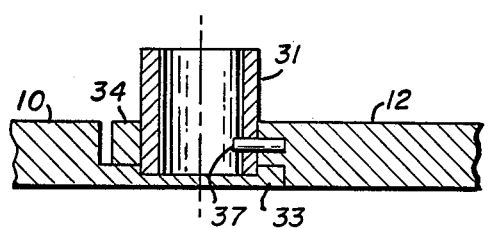
Fig_4d    Fig_4c
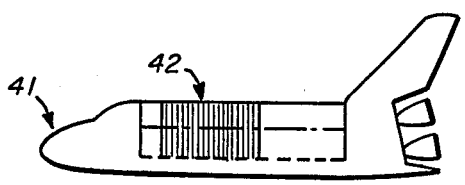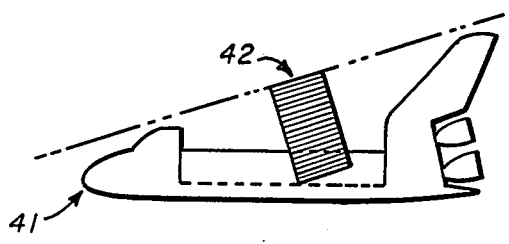
Fig_9    Fig_10

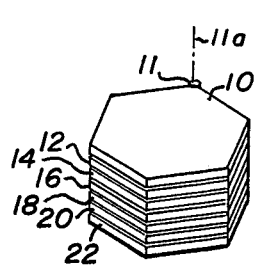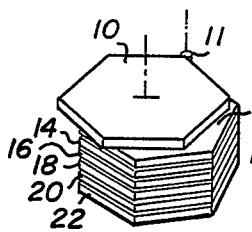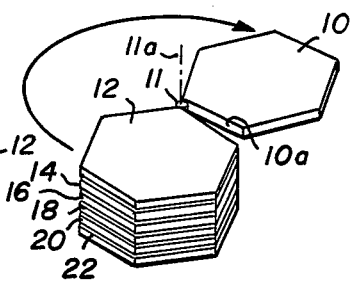
Fig_5a  Fig_5b  Fig_5c  Fig_6a
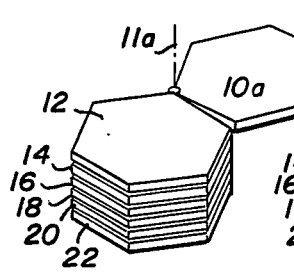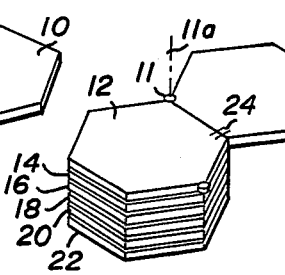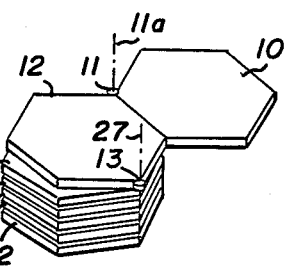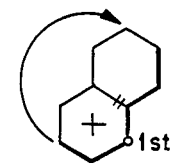
Fig_5d  Fig_5e  Fig_5f  Fig_6b
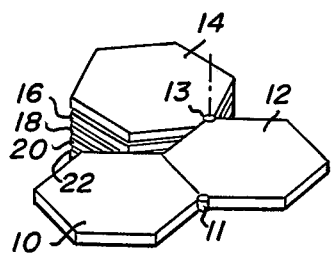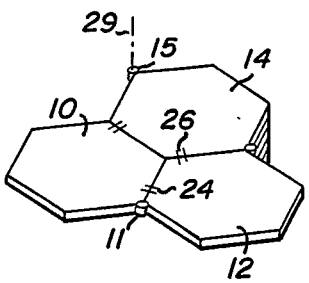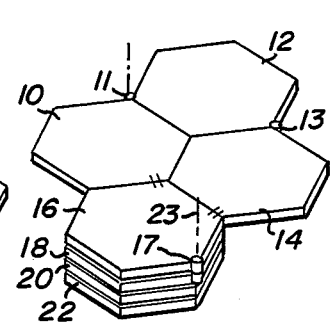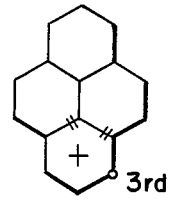
Fig_5g  Fig_5h  Fig_5i  Fig_6c
Fig_6d
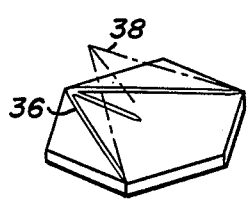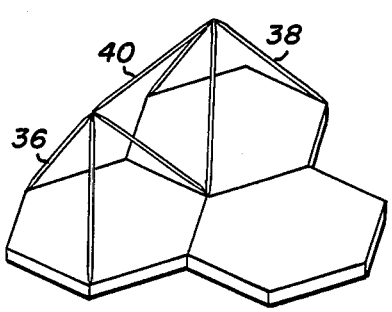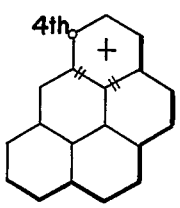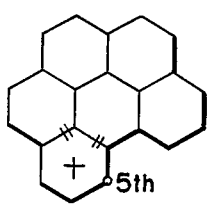
Fig_7a  Fig_7b  Fig_6e  Fig_6f
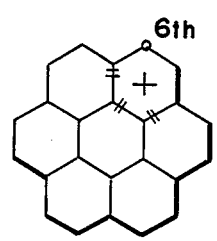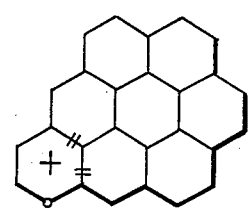
Fig_6g  Fig_6h

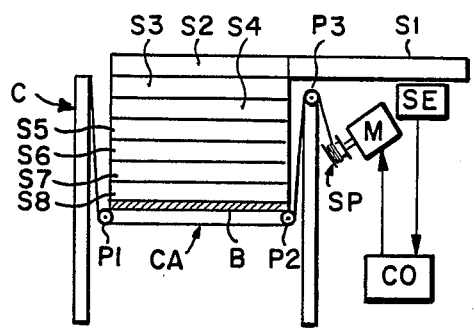
Fig_8
Fig_11d
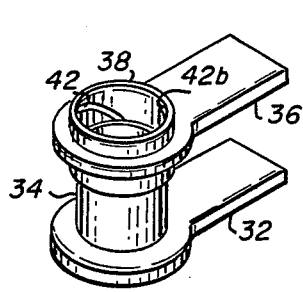
Fig_11a
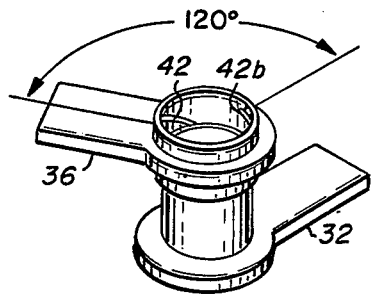
Fig_11b
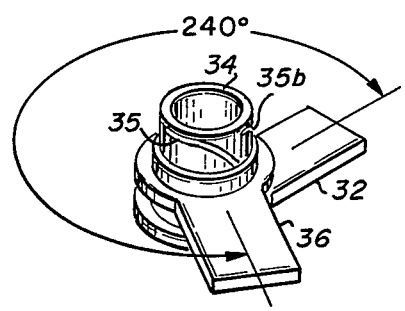
Fig_11c
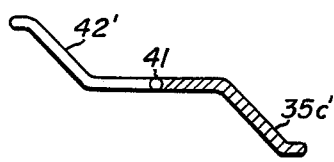
Fig_12a
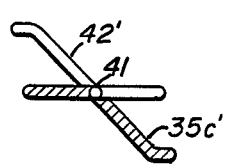
Fig_12b
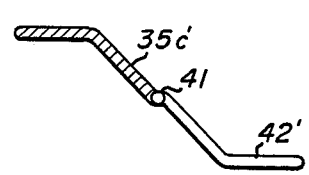
Fig_12c
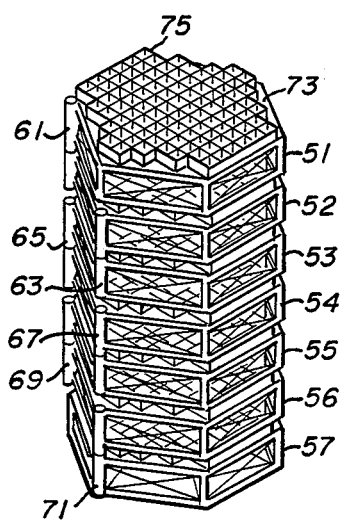
Fig_13
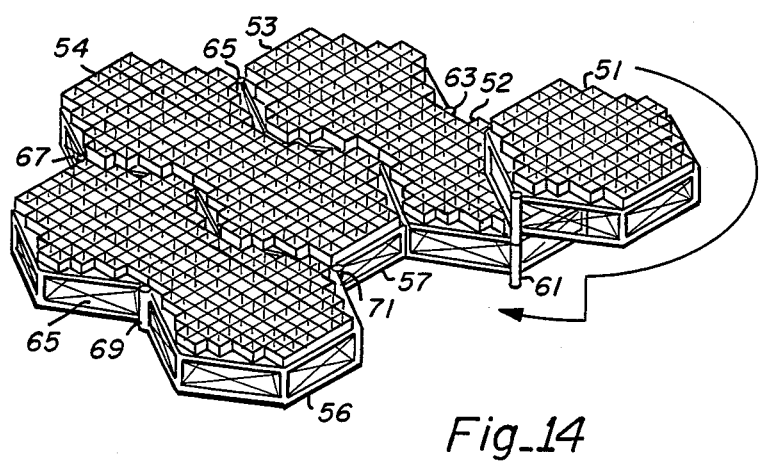
Fig_14

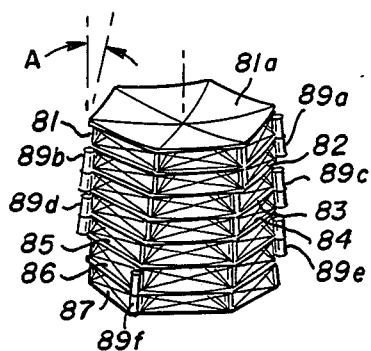
Fig_15
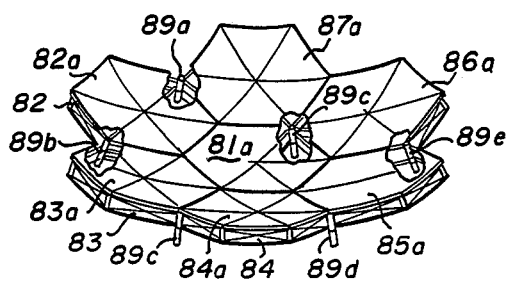
Fig_16
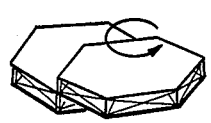
Fig_17a
STACKED
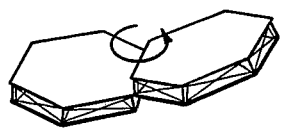
Fig_17b
60°
Fig_17c
120°
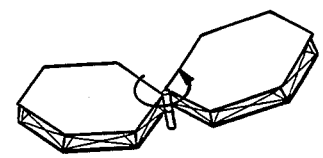
Fig_17d
175°
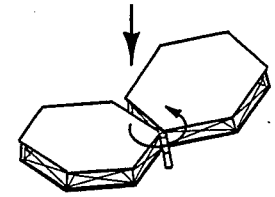
Fig_17e
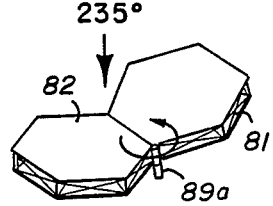
Fig_17f
240°
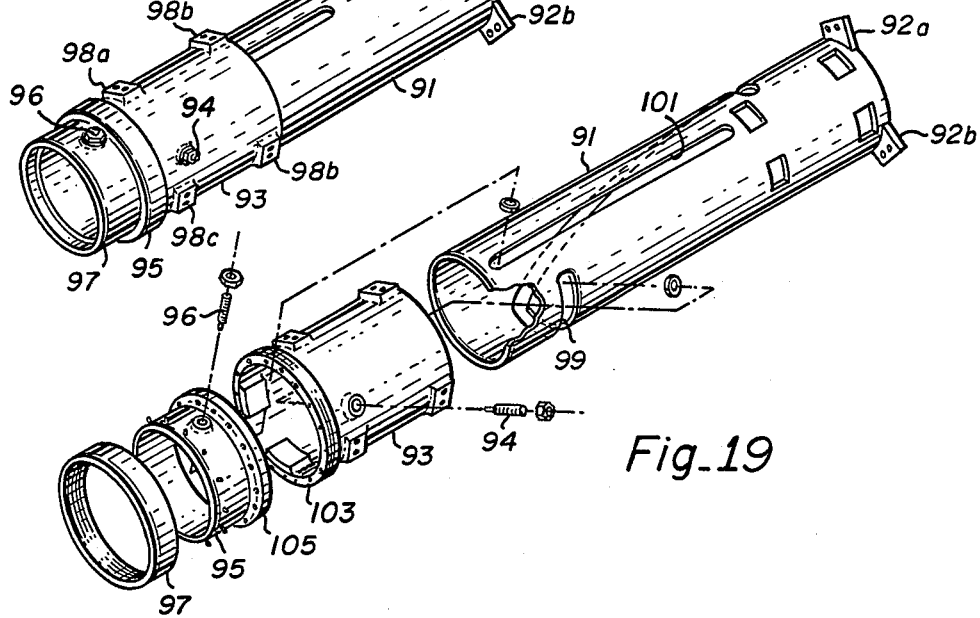
Fig_18
Fig_19

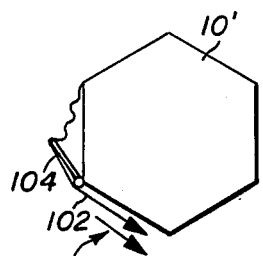
Fig_20a
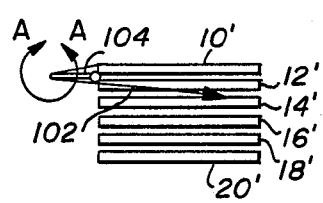
Fig_20b
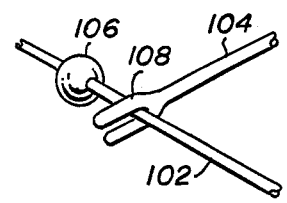
Fig_20c
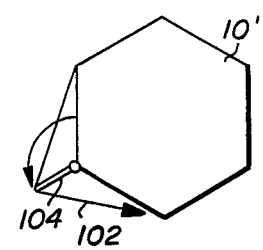
Fig_20d
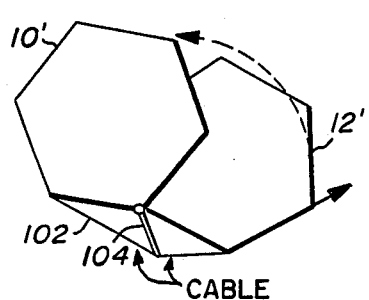
Fig_20e
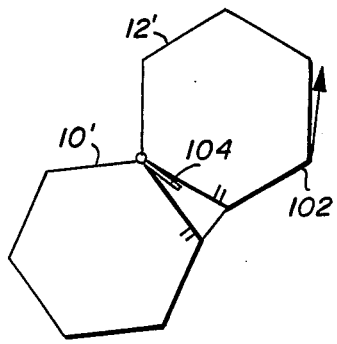
Fig_20f
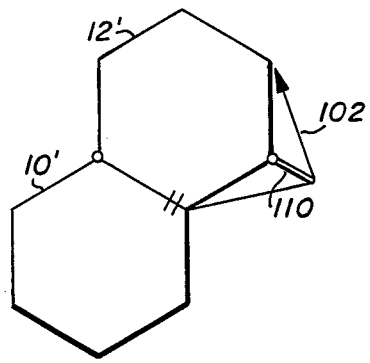
Fig_20g
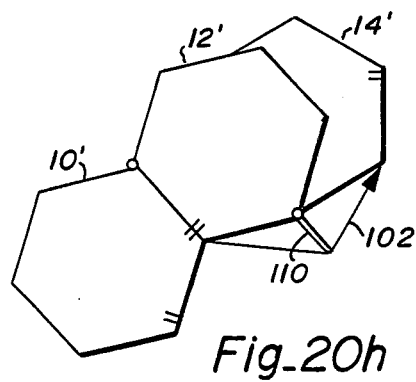
Fig_20h
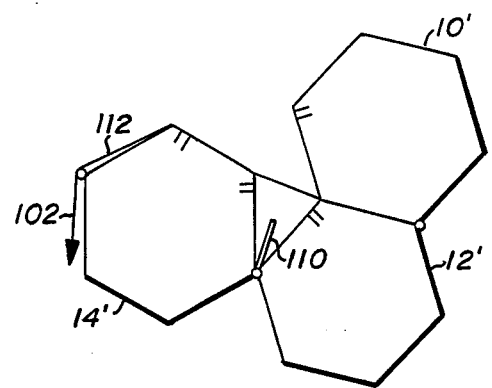
Fig_20i
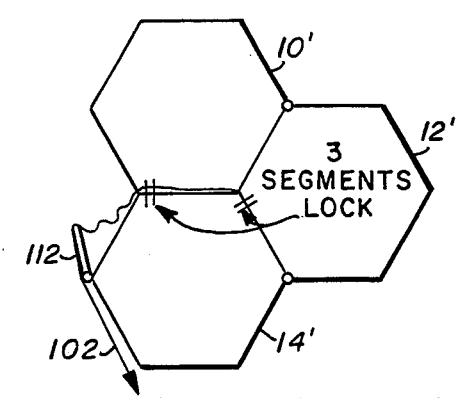
Fig_20j
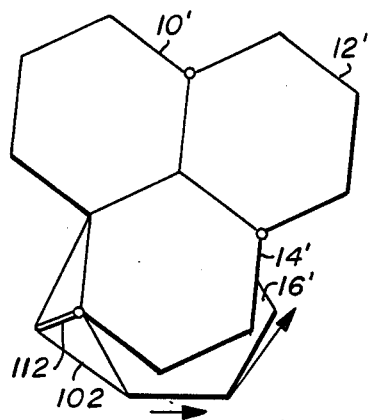
Fig_20k

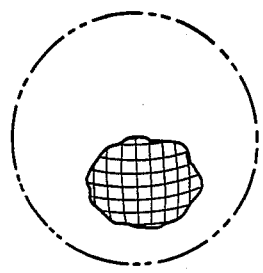
Fig_21a
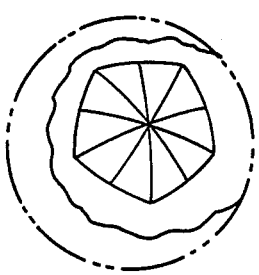
Fig_21b
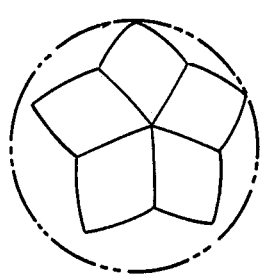
Fig_21c
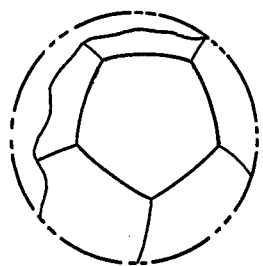
Fig_21d
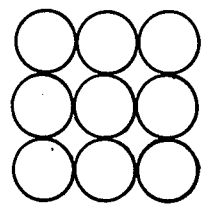
Fig_21e

STOWABLE REFLECTOR

FIELD OF THE INVENTION

This invention relates to stowable construction surfaces and, more particularly, relates to a stowable construction surface used to reflect electromagnetic energy.

BACKGROUND

A surface of simple geometry, such as a frame or flat surface, that covers a wide area, is found in many applications in daily life: A wall which acts as a barrier; a billboard or sign, which is used to deliver a message; a solar panel, which is used to collect the suns rays; an electromagnetic energy reflector, which serves to reflect light and microwave energy are examples of known surfaces. Those surfaces are constructed. They may be assembled as a permanent structure or, alternatively, as a temporary arrangement to fulfill a temporary need. Some are prefabricated at one location, moved to a different site, and then finally assembled. In each of the given examples, devices and techniques are known which are intended to facilitate the construction of the surface in a prompt and efficient manner.

Some surfaces are of a complex nature and thus impose greater demands for skill on the part of the workman who constructs it. In turn, simplified construction techniques or preassembly lowers the workman's skill requirements or, alternatively, allows the skilled person to accomplish the assembly more quickly. Another requirement alluded to previously is the prefabrication and transportation of the surface. Depending upon its ultimate size, the surface may be difficult or impossible to transport in one piece in conventional vehicles. Hence, surfaces of that character are packaged or folded down into a more compact shape for transportation in conventional vehicles. The lay person is most likely familiar with packaging techniques used in connection with the purchase of unassembled furniture. One may purchase a desk on display at the furniture store. The one delivered, however, arrives in a flat package, broken down for convenient transportation, and allows for assembly at home with the assistance of a screwdriver, screws, and quick fasteners, guided by an instruction sheet. Those who have tried understand; assembly is not as easy as it looks.

The demands for portability, easy transportation in compact form and ease of on-site assembly is especially critical in those surfaces that have electromagnetic energy reflecting properties and application as "reflectors", such as those which reflect visible light, infrared and microwave signals, particularly those reflectors intended for use in or about space vehicles deployed in the outermost regions of outer space. Those skilled in space application understand that the size of the transportation vehicle, such as that vehicle referred to as the "space shuttle", is limited. The shuttle cannot transport a fully assembled reflector, such as those used in radiometry, into deployment. Instead the reflector must be transported in a packed form, as part of an antenna, and on command is automatically extended and unfolds to cover a wide area. Both size and weight are limitations in this application and the limitations imposed must be respected.

Examples of reflectors appear in the patent literature. For additional background, one may make reference to U.S. Pat. No. 2,471,828 granted May 31, 1949 to Mautner; U.S. Pat. No. 3,354,458 granted Nov. 21, 1967 to Rottmayer; U.S. Pat. No. 3,617,113 granted Nov. 2, 1971 to Hoyer; U.S. Pat. No. 3,717,879 granted Feb. 20, 1973 to Ganssle; U.S. Pat. No. 4,115,784 granted Sept. 19, 1978 to Schwerdtfeger et al; U.S. Pat. No. 4,475,323 granted Oct. 9, 1984 to Schwartzberg et al; and to U.S. Pat. No. 4,482,900 granted Nov. 13, 1984 to Bilek et al.

One known type of reflector has many advantages. This is one assembled from hexagonal or quasi hexagonal segments. One such reflector is described in an article appearing in Astronautics and Aeronautics December 1977 entitled "An Entry for Large Space Antennas" authored by Messrs. Powell and Hibbs of the Jet Propulsion Laboratory of Cal Tech. That same article also suggests using an off axis feed parabolic antenna constructed from hexagonal segments. Thus a planar array made of hexagonal elements is bent over from the planar shape slightly through means of struts, trusses and/or braces to form a parabolic geometry. The antenna covers a wide area and is composed of many identical regular hexagon shaped panels.

Even if one may easily assemble a large surface on the ground, it is an altogether different matter doing so in the vacuous region of outer space. In this instance, the working man, an astronaut, wears a cumbersome space suit; the person cannot deal in a timely manner to assemble a large multitude of hexagonal panels for example, on the order of a 50, 100 or more panels, and the person would quickly tire due to the physical restraints imposed by the space suit. So far as is known, no large reflector of that type has been deployed in that application.

An object of the invention, thus, is to provide a new and more easily assembleable construction surface. It is an additional object of the invention to provide a stowable construction surface formed of hexagon shaped panels that is easy to assemble and requires minimal skill and physical dexterity to do so. A still further object is to provide a construction surface that is packaged in a compact form and which is easily assembled into a surface covering a wide area, without the need for the workman's significant manual intervention and customary skills. It is a still further object of the invention to provide an improved portable automatically assembleable reflector that is stowable in and transportable by existing space vehicles. It is a still additional object of my invention to provide an electromagnetic energy reflector that may be easily deployed and constructed in outer space without imposing undue physical burdens upon the astronaut. Those objects are achieved with the various structures characteristic of the invention, which are summarized briefly in the paragraph following.

SUMMARY OF THE INVENTION

In a stowable construction surface structure of the kind having a plurality of surface segments stacked into a small package for storage and transportation, which segments are assembleable into a wholly or partially side by side relationship, either as a final planar or non-planar surface or frame structure or as an intermediate planar surface structure that is bent into a non-planar surface configuration, to thereby form a surface covering a wide area, at least as great in area as the sum of the areas defined by the individual segments, the improvement characteristic of the invention comprises: translational hinge means, such as a step-down hinge means, said hinge means connecting said segments together serially and responsive to pivotal travel of one of said segments relative to the hingedly attached other of said segments for causing said moving segment to move vertically from a position in one plane to the plane containing the stationary segment.

In a specific aspect of the invention, a step-down hinge means includes a pair of cylinders, one tall and the other short, mounted coaxially one over the other, with cylinders of the pair attached to respective adjacent segments. In that aspect the first cylinder contains an elongated slot extending at least partially around the periphery of such cylinder and vertically from a first position along the axis of the cylinder to a second position there along. The second cylinder contains a radially inwardly directed key or pin which is positioned within the slot for travel along the path defined by the slot in the first cylinder. In a more specific aspect of the invention, the surface of each segment contains electromagnetic energy reflecting characteristics permitting the surface to function as a reflector. In a still further aspect of the invention, struts are included to add support to and bend the surface into a non-planar surface, such as a parabola. In an alternative form, the hinge axes are arranged at an angle to the stack axis so as to directly form a parabolic surface. In a more general aspect, the invention includes a combination containing a motor and indexing devices to automatically unstack and deploy the surface structure.

The foregoing objects and advantages of the invention together with the structure characteristic of the invention, which was only briefly summarized in the foregoing passage, and the versatility of its application becomes more apparent to those skilled in the art upon reading the detailed description of the preferred embodiments of the invention, which follows in this specification, taken together with the illustrations thereof presented in the accompanying drawings.

BRIEF DESCRIPTION OF THE DRAWINGS

In the Drawings:

FIG. 1 is a perspective view of an embodiment of the invention depicted in stowed form;

FIG. 2 illustrates pictorially in top plan view the embodiment of FIG. 1 in fully assembled form;

FIG. 2a is a partial section cut away view of the area A—A in FIG. 2 cut away to show a latch;

FIG. 3 illustrates pictorially a partial view of the hinge assembly used in the invention drawn to an enlarged scale;

FIGS. 4a through 4d illustrate design details of the hinge of FIG. 3 and two partial section views of the hinge in initial and final position;

FIGS. 5a through 5i illustrates pictorially various stages of assembly of the embodiment intermediate that depicted in FIG. 2;

FIGS. 6a through 6g schematically illustrates the dispensing of segments in an assembly of the embodiment of FIG. 1 and also illustrates schematically an alternative embodiment containing an additional segment;

FIGS. 7a and 7b shows a modification to the embodiment to provide additional supports;

FIG. 8 schematically illustrates ancillary apparatus to mechanize the assembly of the reflector;

FIGS. 9 and 10 illustrate the construction surface employed as a reflector positioned within a space shuttle vehicle in the packed position and in position oriented for dispensing of the segments;

FIGS. 11a through 11c illustrate in perspective view an alternative form of translational hinge used in the embodiment of FIG. 1 as the hinge appears in stowed position, 120 degrees angular position and in final position, respectively;

FIG. 11d illustrates a bearing race used in the translational hinge of FIGS. 11a through 11c;

FIGS. 12a through 12c schematically illustrates the relative positions of the hinge portions of the hinge of FIG. 11 in each of the angular positions represented in FIGS. 11a through 11c;

FIG. 13 illustrates in perspective view a phased array antenna that incorporates the invention as the antenna appears in stowed conditions;

FIG. 14 illustrates the embodiment of FIG. 13 in perspective view in partially assembled position;

FIG. 15 is a perspective view of still another reflector embodiment as it appears in stowed form;

FIG. 16 presents the reflector of FIG. 15 in assembled form with certain portions cut away to show the locations of the translational hinge;

FIGS. 17a through 17f illustrate the sequence of steps in the assembly of the first two sections of the embodiment of FIG. 15;

FIG. 18 is a perspective view of a translational hinge used in the embodiment of FIG. 15;

FIG. 19 shows the hinge of FIG. 18 in exploded view;

FIGS. 20a through 20k illustrate another embodiment of the invention which contains a mechanism for allowing remote dispensing and the steps in the operation of that mechanism; and FIGS. 21a through 21e illustrate segments of different geometries that may be used in the invention.

DETAILED DESCRIPTION OF THE PREFERRED EMBODIMENT

In accordance with the invention, the construction surface, or as more specifically characteristic of the disclosed application, reflector 1 is illustrated in perspective view in its unassembled or stowed forming FIG. 1. This is the condition of the reflector as stored an as stowed for transport in a minimum size. As shown the reflector contains seven segments or panels 10, 12, 14, 16, 18, 20 and 22 that are oriented on top of the other in a spaced parallel overlying relationship, spaced apart along the assemblies major axis 23. The geometry of the surface of the top panel in this embodiment is a hexagon of a relatively small thickness and is essentially flat or planar; and each of the remaining panel sections is essentially identical in that structure.

A preferred material for the panel is a graphite fiber reinforced epoxy honeycomb. The surface of each panel section possesses an electromagnetic energy reflecting characteristic, and is suitably of an aluminum or copper material or coated with those or other reflective materials, such as silver. As becomes apparent to those skilled in the art, the panels may be constructed of any materials which suit the specific purpose to which the construction surface is applied.

As shown in the figure, a hinge 11 connects panel section 10 to the next immediate panel section 12. Each of the other panel sections is likewise connected to the next adjacent panel by a like hinge. Hinge 13 connects panels 12 and 14; hinge 17 connects panels 16 and 18; and hinge 21 connects panels 20 and 22. The hinges connecting panels 14 and 16, and panels 18 and 20, are not visible in this FIG. The hinges thus serve to connect the panel sections in a concatinated chainlike or serial fashion. Further, the axis of hinges 13, 17 and 23 are coaxial along the same axis 27 and the axes of the two remaining hinges, not visible, are located along axis 29. Sockets 26, 28 and 30 form the female portion of and prongs 26a, 28a and 30a form the male portion of a latch structure which is described later in this specification.

FIG. 2 shows the completely assembled reflector in a top plan view. The seven panels are laid out to form a single large surface with the sides of adjacent panels in abutment with one another and latched together in that abutting relationship. Labeling on each panel illustrates the relative position and degree of rotation relative to panel 10. FIG. 2 also shows the two additional hinges 15 and 19 connecting panels 14 and 16 and panels 18 and 20, respectively. The panels are arranged in a single plane to form a constructed surface of a wide area. In this embodiment the constructed area is an area equal to the sum of the individual surface areas of the seven panels employed.

FIG. 2a is a cut away view of section A—A in FIG. 2, drawn to an enlarged scale. This view shows the prong 24a or male end and socket 24 or female end of a releasable latch that holds panels 10 and 12 together in assembled position. As visible in FIG. 1, sockets 26, 28 and 30 form the female portions of the latch for the associated panels. The two additional sockets and the associated prongs are not visible in the Figures; the location of each, however, is apparent to those skilled in the art.

The releasable latch holds panel members 10 and 12 in that connected relationship until one desires to disassemble and store the structure. The latch formed of plug 24a and socket 24 is of a bayonet type, which is conventional in the fastener art, and includes a projecting compressible spring prong which enters a socket, one of which is located in one panel and the other in the panel that the prior panel abuts. The other latches, including those formed of sockets 26, 28 and 30, are of identical structure. Common velcro type fasteners may be used to form a temporary latched mechanical connection and other alternatives, such as a form of magnet attached to one panel and an iron bar or "keeper" attached to the adjacent panel, also provides a releasable latch. If connections of a more permanent nature are desired, bolts or rivets may be substituted.

Reference is now made to FIG. 3 which illustrates in perspective a portion of panel sections 10 and 12 and the elements of hinge 11 drawn to an enlarged scale. A portion of panel member 12 is also cut away at a location about a hinge portion so as to permit more detailed observation of its construction. As shown, the hinge contains two parts, a cylindrical section 31 integrated with a circular washer shaped bottom wall 33 that in turn is integrally joined to panel 10. The height of cylinder 31 together with the thickness of wall 33 is such as to be no greater than the overall thickness of the panel. This portion of the hinge is sometimes referred to as a male hinge portion. The second portion of the hinge, the female portion, contains a cylindrical ring like member 34 containing a cylindrical passage of a diameter slightly larger than the diameter of the outer wall of cylindrical section 31. As shown, hinge portion 34 is integrally attached to the associated panel 12 and for convenience, this portion is of a small height, although cylindrical sections of greater height may be used as becomes more apparent hereinafter. Two keys or pins 37 and 39 are located on the inside of hinge portion 34 and project radially inwardly. The upper hinge portion is placed in or over the male hinge and the keys or pins 37 are inserted into the slot.

As shown, slot 35 extends about the surface of cylinder 31 at the upper end and detours in an axial direction. The end of the slot is located at a position along the axis of the hinge that is spaced from the axial position of the slots starting point and is at the lower end of cylinder 31. Because of the relative circular construction and of the flat surfaces 33 and 34, the two panels can pivot relative to one another to a limited extent about the hinge axis.

As panel member 10 rotates about the hinge axis relative to panel 12, pins 37 and 39 ride in the slot. Hence, as panel 10 pivots and moves angularly about the axis, the cam follower action of the slot forces panel 10 also to shift in position axially. Thus the hinge also translates the panels pivoting movement into an axial or lateral movement and causes the panel to move or step down from the spaced planar position above the second underlying panel, panel 12, to the plane of the underlying panel. Thus the reference or characterization of the hinge as a translational hinge, more specifically, a "stepdown" hinge is appropriate. An exemplary design for the hinge is presented in FIGS. 4a through 4d to which reference may be made.

As illustrated in the schematic view of FIG. 4a, the panel 10 is located in a position overlying panel 12 and is at that starting position represented in the partial section view of FIG. 4b, which is taken along the lines A—A in FIG. 4a. Key 37 is located in the slot in cylinder 31 and for clarity key 39 is omitted. When panel 10 rotated into the final position, panel member 10 also moves linearly along the hinge axis to the position shown in the partial section view of FIG. 4c which is taken along lines B—B in FIG. 4a, where panels 10 and 12 are shown to be essentially side by side and co-planar. To achieve that relationship, the slot is designed as shown in FIG. 4d so that at approximately 120 degrees or so of pivoting around the axis of the hinge member, the slot descends as a function of rotational movement to a predetermined distance equal to the thickness of the panel member, represented as the difference between a1 and a2 in the figure, and ultimately reaches that final axial position in this representative design at approximately 240 degrees of rotation, the furthermost axial position.

Although other slot configurations may be chosen, the arrangement illustrated permits the panels to rotate away from one another before any axially movement occurs. This allows the moving one of the panels to clear the other before the step-down action begins. Any possibility for panel member 10 to prematurely contact and cause binding with panel member 12 is thus avoided, insuring smooth assembly of the reflector. This same relationship holds true for all of the other panels in the construction surface.

Reference is now made to FIGS. 5a through 5i to illustrate partially and pictorially the sequence of events in assembling the panel into the final form previously illustrated in FIG. 2. Initially panel 10 is pulled and rotated about the axis 11a of hinge 11, moving from the stowed position as illustrated in FIG. 5a. This may be accomplished by hand grasping and pulling or by attachment to the panel of a rope or string, not illustrated, functioning as a tether that is pulled around in a circular path about the axis of the stack. Panel 10 is angularly rotated as in FIG. 5b and approaching approximately 240 degrees about the hinge axis to achieve a position as illustrated in FIG. 5c. As shown the axis of panel 10 is laterally displaced in position from the axis of the stack of remaining panels. At this degree of positional movement, the hinges step-down action becomes effective and, as shown in FIGS. 5d and 5e, at approximately 240 degrees of rotation panel 10 has also moved downwardly along the hinge axis and its side edge 10a travels into the plane of and into a side by side relationship with panel 12. As the panel attains an angular rotation of approximately 240 degrees, the side edge of panel 10 abuts the edge of panel 12 and latch 22, symbolically represented, engages 12.

The rotational force applied to panel section 10 is now transmitted through the attached adjacent panel, panel 12, and that panel is consequently forced to pivot about the second hinge axis 27. As illustrated in FIG. 5f panel 12 moves from the normal stowed position off of a position overlying the surface of and uncovering the underlying surface of the next adjacent panel, panel 14. After approximately 120 degrees of that rotation, the panels achieve a relationship illustrated in FIG. 5g.

As rotational movement continues, panel 12 begins to move down along the axis of the hinge, accompanied by panel 10, and steps down into the plane of panel 14, continuing the rotational movement until an edge of panel 12 engages an edge of panel 14 and latches as represented at 26 in FIG. 5h. As the force applied to panel 10 continues, a rotational force is next coupled to panel 14. In turn panel 14 is forced to pivot about the axis 29 of the associated hinge, hinge 15. Upon completion of the step-down action, panel 14 as depicted in FIG. 5i engages a side edge of and latches to panel 16. Continued application of the force to panel 10 continues the rotation and reorientation of underlying panels as long as there remain panels in the stack to be dispensed.

For greater clarity, this sequence is symbolically illustrated in FIGS. 6a through 6f which illustrate formation in the various stages of dispensing the panel sections from the stack corresponding to the first through sixth rotation. At FIG. 6h, an eight panel is dispensed, assuming a stack containing eight panels is used. In as much as the foregoing sequence in the assembly of the reflector is repetitive, it is not further illustrated or described.

Thus by simply affixing the bottom one of the stack of panels to a stationary object, a working man may physically assemble a complete surface and reflector by simply grasping the first reflector panel or attaching a string or rope thereto and walking around in essentially a circle pulling that one panel. The reflector thus constructed may be propped up on a scaffold or ladder or any like support means to serve as a reflecting surface in a ground based antenna or, if the surface is shiny, for reflecting light as part of a light communication or measurement system, the details of which are not pertinent to the present invention and are well known to those skilled in those arts.

The reflector can be used in that fashion in an outer space application, such as an antenna supported within a space shuttle vehicle. In the crudest form, the astronaut can simply take a rod, such as a hoop stick and force the panel members to move in rotation, aided in this effort by the weightlessness in space of the panels. This becomes a simple task. In effect, the astronaut need only move his arm many times to assemble the small antenna thus described. Alternatively, the astronaut may attach the cord or string, as discussed earlier, and pull it around and around, dispensing panels from the stack. A specific example of the latter arrangement is described more fully later in this specification.

Although an embodiment containing seven panels is illustrated, the number of panels employed in any surface is theoretically limitless. However, as a practical matter the number is limited by available space as well as by the strength of materials. In ground based applications where gravity has an effect, it is necessary to prop up the panels and provide extra support without which the weight of large numbers of panels could cause the hinges to crack or panel sections to crack, causing the surface assembly to collapse. This limitation is not one in the structure but is a practical limit brought about by the strength of materials used. Although the panels are assembled to form a planar surface in this embodiment, the invention is not so limited; non-planar surfaces may be formed as is described elsewhere in this specification.

For a large reflector, the panel thickness is required to be quite thin due to a limit on the overall height of the stack imposed by space limitations within the transportation vehicle. In that situation, the edge of the reflector may be modified to include a rim to improve rigidity. Such a rim may be formed by struts and braces which can be included on selected peripheral ones of the panel sections. Reference is made to FIGS. 7a and 7b which show exemplary struts 36 and 38 and the positioning of those struts. The panels that lie along the edge of the reflector contain attached struts on the opposite side to that of the reflecting surface. The struts are folded for storage. They extend, as illustrated in FIG. 7b, to form a tetrahedron pyramid when released. An attaching brace 40 is included between the apexes of the tetrahedron pyramids to form a rigid rim around the reflector.

In alternative forms, the reflector of the invention may comprise many hundreds if not thousands of panels, subject to the aforecited limitations, and for that application additional mechanisms are preferably employed in combination to assist in the surfaces assembly. Thus for example, an improved combination especially adapted for use in outer space application through the vehicle of a spacecraft, such as a shuttle or the like, may take the form illustrated in FIG. 8. FIGS. 9 and 10 illustrate schematically a space vehicle 41. The reflector panel assembly 42 is shown stowed in that vehicle as in FIG. 9 and the assembly is raised for deployment as presented in FIG. 10.

The panels are contained in a cradle and includes a motor mechanism and a latching indexing mechanism symbolically illustrated in FIG. 8. Once space vehicle 41 is in low earth orbit, the cargo doors, not illustrated, are opened. The motor then tilts the stack of panel sections upward at an angle and the motor commences rotation of the panels. The indexing mechanism moves up the stack by one panel thickness to release the first panel from the cradle; the first panel is rotated on a hinge as previously described in connection with the earlier embodiments to abut the edge of the underlying panel. The stack of panels is then indexed up the thickness of the panel in relation to the cradle as the dispensed panels are rotated about the next hinge. This sequence is repeated until all of the panels are assembled to form a reflector dish.

One form of indexing mechanism which may be employed in connection with the invention is symbolically illustrated in FIG. 8. As illustrated the stack of segments S1 through S8, one of which has been dispensed, are mounted in a cradle C having a movable platform or base B. The base is mounted upon a pulley cable arrangement consisting of cable CA, mounted at one end to the left upper end of the cradle and extending over pulleys P1, P2, and P3. The other end of the cable is taken up on spool SP. The motor M drives the take up spool. As motor M operates to turn the spool, the cable is wound upon the spool causing base B to be raised. The control circuit co monitors the input from the segment position sensor SE. In response to an input from the sensor, the controller provides a current to operate the motor for a predetermined duration, which is a duration sufficient to wind enough cable upon the spool as causes base B to move vertically by a distance of one segment thickness. This process continues until all of the segments are dispensed.

FIGS. 11a through 11c illustrate an alternative construction of the step down hinge illustrated and described in connection with the preceding embodiment. The hinge incorporates a ball bearing arrangement between the cylindrical hinge elements to reduce friction between its parts and, hence, reduce the amount of torque or force required to pivot one hinge section relative to the other. FIG. 11d depicts an exemplary bearing race by means of which the three ball bearings are attached to cylinder 34, the male hinge portion.

FIGS. 12a through 12c symbolically represent in a linear plane the relative configuration of the inner bearing race, the outer bearing race of the hinge and the ball bearing at various angular positions between the male and female hinge elements. These representations may be considered together with the illustrations of the hinge presented in FIGS. 11a through 11c with the hinge elements illustrated in the same relative angular positions.

As shown in FIG. 11a, the hinge includes a male section containing an arm 32 and an upwardly extending cylinder 34. Cylinder 34 carries a bearing carrier depicted in FIG. 11d, referred to as the ball spacer, on its outer peripheral surface. However, the ball bearing spacer and its configuration is obstructed in this view by the elements of the female hinge portion. The female hinge portion includes the arm 36 to which is attached a cylinder 38 which is fitted within a circular opening at the end of arm 36. A bearing race 42 is formed by a groove in the inner cylindrical surface of cylinder 38. An additional race 42b is partially visible in this view. The inner wall surface of cylinder 38 includes a third bearing race not visible in this figure. Each of the races is spaced equi-distant about the inner periphery of cylinder 38.

Reference may be to FIG. 11c. The inner race, which was not visible in the view of FIG. 11a, is better illustrated in this figure as element 35. A portion of the second inner race 35b is also visible in this view. The outer surface of cylinder 34 contains a third outer or groove, not visible, that is of identical construction to the inner race structures illustrated. The inner race for the bearings are also spaced equi-distant around the outer surface of the cylinder 34.

The step down hinge illustrated in FIG. 11a is represented in the position in which the construction surface segments or panels are stowed in overlying relationship, essentially the normal or start position. As schematically illustrated in FIG. 12a, the bearing race 42, represented as 42′ and the associated inner bearing race 35C′ are positionally oriented as depicted with bearing 41 fitted between. As arm 36 swings counterclockwise by approximately 120 degrees about the hinge axis, the relationship of the hinge elements is as depicted in FIG. 11b; the position of the bearing 41 and the inner and outer bearing races 35C′ and 42′ are as depicted in FIG. 2b. As the hinge elements move relatively to 240 degrees of rotation, which is the final position as described in the preceding embodiments in which the associated two panels coupled to the hinge arms attain a final position, in the same plane so to speak, the position of the hinge elements is as depicted in FIG. 11c as there shown arm 36 has moved through 240 degrees of arc. The arm has also moved axially from a position at one location along the axis laterally spaced from arm 32 to a second position closely proximate that arm. The reader may observe this translation in the figures by comparing the spacing between those arms presented in FIG. 11a with that in the final position in this FIG. 11c. Concurrently the inner race 35C′ as presented in FIG. 12c, has moved to an angular position to the left of the outer race 42′ with the ball bearing 41 therebetween. In effect the two races have exchanged positions. Typically the ball bearings are contained in a sleeve or bearing holder that is fitted between the two coaxial cylinders of the hinge joint as represented in FIG. 11d.

In the embodiment of the invention presented in FIGS. 1 through 6, the segments or panels are of a solid construction. As those skilled in the art appreciate, the panels may be of other known constructions, including a hollow construction, which would serve to further reduce the weight of the surface assembly. Moreover the construction surface may be made of a grid like frame or scaffold, as variously characterized, in which the grid or scaffold is assembled and following assembly, other elements, such as a sheet of thin material, is then attached. Alternatively the frame can support a relatively thin panel or covering and in turn this covering is used to support other elements. All of such configurations incorporate the features characteristic of the disclosed construction surface, as those skilled in the art appreciate.

By way of example, a further embodiment of the invention is presented in FIGS. 13 and 14 to which reference may be made. The embodiment of FIG. 13 contains seven hexagonal shaped segments 51, 52, 53, 54, 55, 56 and 57. Segments 51 and 52 are interconnected by translational hinge 61; segments 52 and 53 are interconnected by hinge 63; segments 53 and 54 are interconnected by hinge 65; segments 54 and 55 by hinge 67; segments 55 and 56 by hinge 69; and segments 56 and 57 by hinge 71.

As shown in the figure, segment 51 is comprised of a grid like frame or skeleton that is completely open and extends over a wide area. The top of the grid is covered with a thin sheet material or panel 73 which forms a support surface in this embodiment. A large number of elements 75 represented as being box like in geometry with an extending probe are supported and attached to panel 73, only one of which is labeled. Each of the elements 75 is an RF receiving device of the type found in a modern radar system, symbolically represented. The receivers are individual RF pickup or inputting devices for receiving electronic RF signals and the receivers together form the inputs to a phased array radar antenna configuration.

In one manner of assembly described in connection with the preceding embodiments, segment 51 is rotated clockwise about hinge axis 61. Segment 51 steps down in position along the hinge axis and relocates into essentially the plane of the underlying segment 52. As this process continues, the radar antenna, which incorporates the construction surface, is formed into a planar surface as in the preceding embodiment.

Although the assembly process for the planar array antenna of FIG. 13 was described as commencing with the rotation of the first segment, segment 51, it is also possible to start assembling the surface from the bottom end, such as by rotating segment 57 clockwise about axis 71. In that case, segment 57 after 240 degrees of rotation "steps up" into the plane of segment 56 to which it is hingedly connected. In like manner, segment 56 is then rotated and moves through 240 degrees of rotation and then segment 56, in effect, "steps up" into the plane of segment of 55. With a continuing application of torque, segment 55 is forced to commence pivotal rotation about axis 67. This procedure continues until segment 52 is in position to step up into the plane of the final segment 51 attaining the configuration illustrated in FIG. 14, which shows all of the segments 52 through 56 in a side by side essentially co-planar relationship, with the final segment, segment 51, as yet not in final position.

Although the hinge is referred to as a "step down" hinge, it also is viewed as a "step up" hinge by simply reversing the manner in which the construction surface is assembled: If the first segment that is moved is the one at the top of the stack, the hinge causes a "step down" translation. If, however, the first segment moved is instead the bottom most segment, then the hinge causes a "step up" translation. It is recognized that the terms step up and step down may be used interchangeably. More generic words to describe the hinge characteristic is to refer to the hinge characteristic as axial translational hinge, as a vertically stepping hinge or simply as a "translational" hinge as was used earlier in this specification in connection with the prior embodiments.

As is apparent, the segment used in the embodiment of FIGS. 13 and 14 is relatively thick. Although the physical configuration of the hinges described in connection with the preceding embodiments of the invention may be used, it is preferable if the hinges are connected to both the top and bottom ends of the associated segment or, alternatively, form one of the braces that defines the hexagonal grid and frame arrangement for the segments illustrated; adding support to the segment in addition to performing the hinge function. This requires the hinge portions be of greater length than in the preceding embodiments and is the two part elongate cylinders represented in the figure. A hinge of this configuration is described in connection with FIGS. 18 and 19 hereinafter.

The construction surfaces of preceding embodiments provide an assembly in which the individual segments are oriented into an essentially co-planar side-by-side relationship. As those skilled in the art appreciate, the planar relationship is a result of the orientation of the hinge axis with respect to the axis of the stack. All of the hinge axes are aligned parallel to one another as well as to the major axis of the stowed assembly in those embodiments. The invention, however, is not so limited. Other surfaces may be defined. The individual segments or panels can be oriented side-by-side to form a surface that is non-co-planar. One such surface, for example, is a parabolic surface. Such a variation is accomplished in part by orienting the axis of the hinges differently than in the preceding embodiments, and, specifically, orienting the hinge axis at an angle to the major axis of the stowed stack of segments.

The versatility of the invention in that respect is illustrated by way of example in a further embodiment depicted in FIGS. 15 through 17 to which reference may be made. FIG. 15 illustrates in perspective a non-planar reflector constructed according to the invention. The reflector is formed of seven segments, 81, 82, 83, 84, 85, 86 and 87, each of which is of a relatively thick gridlike construction. Each grid contains a curved metal surface, 81a through 81f, the latter of which are more easily viewed in the assembled view presented in FIG. 16. Hinges 89a through 89f as illustrated in FIG. 15, connect the individual segments 81 through 87, respectively in the serial chain like manner previously described. Specifically segments 81 and 82 are connected by hinge 89a; 82 and 83 are interconnected by hinge 89b; segments 83 and 84 are interconnected by hinge 89c; segments 84 and 85 are interconnected by hinge 89d; segments 85 and 86 are interconnected by hinge 89e; and the final two segments 86 and 87 are interconnected by hinge 89f. In this embodiment, the axes of the translational hinges are not parallel to the major axis of the assembly stack; instead, the hinge axes are oriented at an angle, designated A1, such as fifteen degrees by way of specific example, to the stack axis.

When fully assembled, the reflector is of the geometry of a curved parabolic surface as illustrated in FIG. 16. To assist in the understanding of the invention, various portions of the metal surface are cut away revealing the location of the underlying translational hinges. As presented in FIGS. 17a through 17f, the initial assembly steps for two of the hexagon shaped segments in the reflector are symbolically illustrated. As there shown, the uppermost panel is rotated counterclockwise in FIGS. 17a through 17c. Hence the vertically translating hinge commences to allow the uppermost panel to descend vertically or "step down" in this embodiment along the hinge axis so that one of the straight side edges of the hexagon shaped panel descends to the plane or level containing the edge of the underlying hexagon shaped panel into the final step as represented in FIG. 17f. As in the preceding embodiments, this counterclockwise motion continues until the reflector is completely assembled as was depicted in FIG. 16.

An additional form of vertically translating hinge is presented in FIG. 18 in perspective view and in FIG. 19 in an exploded view. Hinge 90 includes a cylindrical member 91 or cam shaft, a second cylinder or collar 93, which is coaxial with and fits over cam shaft 91, a bearing retainer 95 of cylindrical shape and a collar 97. The latter collar contains a pin assembly 94, which contains an inwardly radially projecting pin, not illustrated in this figure. Collar 97 also contains a pin assembly 96 and that pin assembly includes a radially inwardly directed or projecting pin, not illustrated in this figure.

Cam shaft 91 includes a pair of tabs 92a and 92b with openings to allow attachment of the shaft by means of bolts or other conventional fasteners, not illustrated, to one of two hingedly interconnected panels. Collar 93 includes protrusions 98a through 98d. The protrusions contain threaded openings permitting the collar to be attached to a second one of the two panels, referred to but not illustrated in the figure. As is better illustrated in the exploded view in FIG. 19, the cam follower includes a slot 99 which extends along the arc of a circle about the axis of the shaft and then is sloped or descends gradually downwardly vertically along the shaft, as represented by the dotted line portion, in accordance with the hinge design criteria previously described in detail. A second vertical slot 101 extends along the axis a predetermined distance. It is noted that axially extending slot 101 is positioned in the remaining 120 degrees of arc that is not occupied by the sloped slot 99.

Pin assembly 94 includes a projecting pin end and a threaded end, the latter of which fits within the threaded opening in collar 93. As is conventional, the pin is threaded into the collar opening to a depth at which the end of the pin engages slot 99. Lockwasher 97 is threaded onto the member 94 and tightened, to locking the pin in place. The same construction and assembly is employed in connection with the pin member 96 supported in collar 95 to lock the pin into the axially extending straight slot 101.

The collar supports a thrust bearing 103 located at its upper end in the figure. The bearing is of conventional structure. The collar 95 includes an opposed thrust bearing member 105 on its rear surface which is also of conventional structure. Collar 93 is fitted into place over the cam shaft 91 and oriented so that the opening for pin assembly 94 is over slot 99, allowing the threaded pin to be inserted and engage the slot. Thereafter collar 95 is fitted over the end of the bearing and pin 96 is installed engaging slot 101. As is apparent to the skilled reader, bearing surfaces 103 and 105 allow collar 93, which serves as the female portion of the hinge, to rotate or pivot relative to the collar 95. Thereafter, the bearing retainer is fitted over the collar engaging the thrust bearing member 105 and the retainer is screwed onto the threaded end of the collar to attain the final form illustrated in FIG. 18.

In operation as the collar is rotated relative to cam shaft 91, the collar changes in angular and vertical position moving down along the shaft. In so doing, the collar pulls along and carries with it the second collar 95 which remains angularly fixed and rides down vertically along the axis of the cam shaft guided or held in angular position by the pin 96. The thrust bearing arrangement provides a relatively low friction hinge, requiring low torque or force to cause pivotal movement between the two hinge sections. The hinge of this figure contains a single vertically extending slot in contrast to the three identical slots presented in the hinge of FIG. 7. The vertical slot which serves as a guide has the stabilizing effect of preventing the female portion from becoming misaligned or binding during the relative angular movement between its male and female portions. It thus obviates the need for the three slot arrangement previously described in connection with the alternative hinge construction.

Automatic deployment devices may be based on a beaded cable and a simple forked horn arrangement illustrated in the embodiment of FIGS. 20a through 20k. As shown in FIG. 20a, a cable 102 is attached to the first segment 10' and is coupled to a pivotally mounted horn 104 that is folded in between the top segment and the underlying segment, not illustrated in this figure. The cable contains slack between its attachment to segment 10' and horn 104 and extends forwardly of the horn so as to allow a length from which the cable can be pulled taut. In FIG. 20b this structure is illustrated in front side view and FIG. 20c illustrates in an enlarged scale the portion of the horn and cable arrangement represented in the cutout lines A—A.

As illustrated in FIG. 20c, the cable contains a bead 106. The cable is drawn through a fork 108, which is of u-shape and is attached to the stem or top end of horn 104. The horn is pivotally mounted, but its pivotal movement is limited to a position in which it stands along a radial line from the center of the segment 10'. This essentially allows the horn to pivot approximately sixty degrees. As cable 102 is drawn forward, the bead engages the horn and the force on the cable is transmitted through the horn to initially unfold and pivot the horn through sixty degrees at which the horn is upright and reaches its pivot stop or limit. Continued pulling on the cable and bead applies torque through the horn to the first segment, segment 10', causing the segment to rotate. This state is represented in FIG. 20d showing horn 104 upright and cable 102 is pulled taut. The reader is assumed to have a thorough understanding of the preceding embodiments and is thus familiar with the operation of the translational hinge and the sequence by which the segments are rotated and dispensed to form the wide area surface. The description of FIG. 20 is therefore limited to the operation of the cable and horn structure to dispense and/or assemble the segments into the surface.

As shown in FIG. 20e, the cable is pulled taut forcing the first segment to rotate about its hinge line. At a point in that rotation of the segment, the cable releases from the horn. At that angle, the horn is oriented so that the bead can slide off the back surface of the fork. That sliding can be visualized by making reference to the enlarged view of FIG. 20c and assuming the cable and the orientation of the fork to be essentially parallel so that the bead slides over the fork. As shown in FIG. 20f, the cable has released from the horn and as the segment 10' is pivotally pulled around by the cable, horn 104 is in effect discarded. As this occurs, the cable engages a second fork 110 located between the second and third segments causing the second horn to move into an upright position as the cable is pulled taut in the same manner described for the first horn. This is represented in FIG. 20g. As represented in FIG. 20h, second segment 12' is rotated about its hinge as the cable is pulled. The cable releases engagement with the second horn and engages a third horn 112 located between the third and fourth segments as represented in FIG. 20i. As the cable is pulled, segment 14' is rotated further and locks into place in abutment with segment 12' as shown in FIG. 20j. As further represented in the FIG. 20j, the cable bead engages and pivots up the third horn located between the third and fourth segments. This process continues as segment 14' is rotated around a pivot point as represented in FIG. 20k. The structure contains a horn of the type described between each of the segments in the stack, all of which function in the manner described. It is thus unnecessary to carry the description further.

The beaded cable and fork arrangement thus provides a simple, inexpensive, and easy to use arrangement for automatically assembling the individual segments into a construction surface such as a reflector. The foregoing is illustrative of one construction and is not intended to limit the invention in as much as other automatic or semi-automatic dispensing devices becomes apparent to those skilled in the art in accordance with the teachings presented in this specification.

The stowable construction surface or reflector embodiment of FIG. 1 contains segments that are of a hexagon shape in geometry. As those skilled in the art appreciate, the geometry of the segments used is not limited to a hexagon; it can be of other familiar geometric shapes such as, a triangle, a square, a pentagon, a doedecahedron and the like. Segments of those geometries illustrated in cut outs in FIGS. 21a through 21e may be formed into a stowable construction surface and form an essentially solid surface when unfolded. If one desires to have a surface which contains openings, that is, does not need to be continuous, then segments of other geometries may be used, for example, a circle. If the circles are stacked and interconnected in the arrangement illustrated in FIG. 1, then the surface is unfolded into the state represented in FIG. 2, the circles contact one another tangentially and leave arcuate gaps or openings.

I believe that the foregoing description of the preferred embodiments of the invention is sufficient in detail to enable one skilled in the art to make and use the invention. However, it is expressly understood that the detail of the elements which is presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. In a stowable portable construction surface of the kind having a plurality of segment means of essentially identical configuration stacked along a common axis in overlying relationship for storage in minimum space and being assembleable into a side by side laterally displaced relationship to extend over a wide area; the improvement therein which comprises in combination therewith: translational hinge means: said hinge means connecting said segment means together serially and responding to pivotal movement of one of said segment means for causing said one pivotally moving segment means to move from said stacked position to a unstacked position in side by side relationship with said adjacent segment means and axially and laterally displaced from said stacked position.

2. The invention as defined in claim 1 wherein said translational hinge means comprises a step down hinge.

3. The invention as defined in claim 1 wherein said segment means comprise:
tubular frame means, said frame means defining a hexagon geometry; and a thin sheet attached to one side of said frame means to provide a continuous surface.

4. The invention as defined in claim 3 further comprising: a plurality of RF energy receiving means, said receiving means being attached to and supported upon said thin sheet of a corresponding one of said segment means.

5. The invention as defined in claim 1 wherein each of said segment means includes a panel surface, said surface being of a parabolically curved segment of a paraboloid.

6. The invention as defined in claim 1, wherein each of said segment means includes a panel surface, said panel surface being of a flat geometry.

7. The invention as defined in claim 5 wherein said hinge means contains an axis, said axis being oriented at an angle to said stack axis.

8. The invention as defined in claim 1 wherein said segments are of a hexagon geometry.

9. The invention as defined in claim 1 wherein said segments comprise a geometrical shape forming a member of the following class of shapes; a hexagon, a square, a triangle, a pentagon, a doedecahedron and a circle.

10. A fold out reflector assembly for reflecting electromagnetic energy comprising:
a plurality of substantially identical panel means including top panel means, bottom panel means, and intermediate panel means located intermediate said top and bottom panel means, said panel means having reflecting surfaces containing six corners;
a plurality of hinge means for connecting said panel means together in a serial manner for permitting pivotal movement between said panel means about a hinge axis, each said hinge means comprising a female hinge portion for connection to one of said panel means and a male hinge portion for connection to another one of said panel means adjacent to said one panel means;
each of said intermediate panel means having attached thereto a female hinge portion associated with a one of said hinge means and a male hinge portion associated with another one of said hinge means, said hinge portions being attached at different corners of the associated panel means;
said hinge means further comprising: step down hinge means responsive to pivotal movement of one panel means relative to the other hingedly connected panel means for causing one of said male and female hinge portions to move axially along the hinge axis relative to said other hinge portion for permitting a pivoting one of said panel means to which one of said hinge portions is attached to move between a first position axially aligned with an adjacent attached panel means to which the other of said hinge portions is attached and a second position axially and laterally displaced from said adjacent attached panel means.

11. The invention as defined in claim 10 wherein said step down hinge means includes:
first cylinder means having an axis;
second cylinder means having an axis;
said first cylinder means being coaxially mounted over said second cylinder means for relative rotational movement therebetween; said first cylinder means containing an elongated slot, said slot extending at least partially around the periphery of said first cylinder means from a first position along the axis of said cylinder means to a second portion along said axis; and
said second cylinder means containing radially inwardly directed key means, said key means being positioned within said slot for travel along the path defined by the slot.

12. The invention as defined in claim 11, further comprising: a plurality of latch means, each said latch means being associated with a corresponding one of said panel means and responsive to the movement of said corresponding one of said panel means into co-planar abutting relationship with a serially connected adjacent one of said panel means for releasably holding said panel means together in said abutting co-planar relationship.

13. The invention as defined in claim 12 wherein said plurality of panel means are located in overlying relationship with one another in a stack with the top panel means located in a first plane and an intermediate panel means located in a plane underlying said first plane and further comprising:
means for moving a top most one of said panel means about said hinge means;
indexing means for advancing the position of said stack to said first plane; and monitor means responsive to engagement of said latch means for causing said indexing means to advance said stack to said first plane and initiating operation of said motor means.

14. In a stowable portable construction surface of the kind having a plurality of panel means of essentially planar geometry stacked along a common axis in overlying essentially parallel spaced relationship for storage in minimum space and assembleable into side by side essentially co-planar relationship to thereby form a surface having a wide area; the improvement therein which comprises: step down hinge means, said hinge means connecting said panel means together serially and responding to pivotal movement of one of said panel means relative to an attached other of said panel means for causing said moving panel means to step down from an initial position overlying said hingedly attached other panel means to a subsequent position in side by side relationship with said attached other panel means and laterally and axially displaced from said initial position.

15. The invention as defined in claim 14 wherein said segments are of substantially identical size and shape.

16. The invention as defined in claim 15 wherein said shape of said panel means is a hexagon.

17. The invention as defined in claim 15 wherein said shape of said panel is a member selected from the following class: a hexagon, a pentagon, a square, a triangle, a doedecahedron, and a circle.

18. The invention as defined in claim 15 further comprising:
horn means coupled to each of said panel means, said horn means being pivotally mounted for rotation between a folded position against the associated panel means to which said horn means is coupled to an upright position radially outwardly extending from said associated panel means; said horn containing a forked outer end;
cable means, said cable means being attached at one end to an outermost panel means and extending through said fork of said horn means associated with said panel means; said cable means containing a bead means adapted to engage said fork responsive to said cable being pulled taut, whereby said cable means may pivot said horn to the upright position and thereby apply a pivoting force upon said panel means causing said panel means to rotate.

19. The invention as defined in claim 15, further comprising: cable means, said cable means being attached at one end to an outermost panel means for rotating said panel means.

20. A fold out construction surface comprising:
a plurality of substantially identical panel means, including top panel means, bottom panel means, and intermediate panel means located intermediate said top and bottom panel means;
a plurality of hinge means for connecting said panel means together serially for pivotal movement therebetween about a hinge axis, each said hinge means including a male hinge portion for connection to one panel means and a female hinge portion for connection to another adjacent one of said panel means, said hinge means further comprising: translational hinge means responsive to pivotal movement of one panel means relative tot he connected panel means for causing one of said male and female portions to move axially along the hinge axis relative to one another to a predetermined extent for permitting a pivoting one of said panel means to move into the plane of an adjacent attached one of said panel means.

21. The invention as defined in claim 20 wherein said translational hinge means comprises:
first hollow cylinder means of a predetermined outer diameter; said first cylinder means having an axis and containing a first slot and a second slot;
said first slot extending circumferentially from a first location along the axis of said cylinder means over an arc of predetermined length and further extending axially and circumferentially to a second location along the axis of said cylinder means, said second location being displaced from said first location;
said second slot extending straight a predetermined distance parallel to said axis;
second hollow cylinder means having an inner diameter greater than the outer diameter of said first cylinder means, said second cylinder means being coaxially mounted over said first cylinder means;
said second cylinder means containing key means, said key means being radially inwardly extending into said first slot;
third hollow cylinder means having an inner diameter greater than the outer diameter of said first cylinder means and being mounted side by side and coaxial with said second cylinder means;
said third cylinder means containing key means, said key means being radially inwardly extending into said first slot for preventing rotation of said third cylinder means without interfering with axial movement of said third cylinder means;
coupling means coupling said third cylinder means to said second cylinder means for joint axial movement therewith and permitting relative rotational movement therebetween;
means for connecting said first cylinder means to one of said segment means; and
means for connecting said second cylinder means to an adjacent one of said segment means.

22. The invention as defined in claim 21, wherein each of said second cylinder means and said third cylinder means of said translational hinge means contain bearing means for reducing friction to relative rotation between said second and third cylinder means.

23. The invention as defined in claim 20,
wherein each of said panel means is of a hexagonal planar geometry, each of which contains six corners; and
wherein said translational hinge means comprises: a female hinge portion and a male hinge portion; and
wherein each of said intermediate panel means has attached thereto a female hinge portion associated with a given one of said hinge means and a male hinge portion associated with another one of said hinge means, said hinge portions being attached at opposed corners of the associated panel means.

24. The invention as defined in claim 21 further comprising:
horn means coupled to each of said panel means, said horn means being pivotally mounted for rotation between a folded position against the associated panel means to which said horn means is coupled to an upright position radially outwardly extending from said associated panel means; said horn containing a forked outer end;

cable means, said cable means being attached at one end to an outermost panel means and extending through said fork of said horn means associated with said panel means; said cable means containing a bead means adapted to engage said fork responsive to said cable being pulled taut, whereby said cable means may pivot said horn to the upright position and thereby apply a pivoting force upon said panel means causing said panel means to rotate.

25. The invention as defined in claim 21, further comprising: cable means, said cable means being attached at one end to an outermost panel means for rotating said panel means.

* * * * *